US008375916B2

(12) United States Patent
Tisch

(10) Patent No.: US 8,375,916 B2
(45) Date of Patent: Feb. 19, 2013

(54) MASS BALANCING MECHANISM OF AN INTERNAL COMBUSTION ENGINE

(75) Inventor: Siegfried Tisch, Gerlingen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 483 days.

(21) Appl. No.: 12/450,757

(22) PCT Filed: Mar. 11, 2008

(86) PCT No.: PCT/EP2008/052852

§ 371 (c)(1), (2), (4) Date: Apr. 12, 2010

(87) PCT Pub. No.: WO2008/125398

PCT Pub. Date: Oct. 23, 2008

(65) Prior Publication Data

US 2010/0199940 A1 Aug. 12, 2010

(30) Foreign Application Priority Data

Apr. 13, 2007 (DE) ......................... 10 2007 017 873

(51) Int. Cl.
*F02B 75/06* (2006.01)

(52) U.S. Cl. .................... 123/192.2; 123/196 R; 74/603

(58) Field of Classification Search ................ 123/192.2
See application file for complete search history.

(56) References Cited

FOREIGN PATENT DOCUMENTS

| | | | |
|---|---|---|---|
| DE | 10 2005 049 705 | | 4/2007 |
| EP | 0 243 683 | A | 11/1987 |
| EP | 1 081 410 | A1 | 3/2001 |
| EP | 1 304 450 | A | 4/2003 |
| FR | 2 619 881 | | 3/1989 |
| JP | 09 151993 | A | 6/1997 |
| JP | 2006 002852 | A | 1/2006 |

*Primary Examiner* — Noah Kamen
(74) *Attorney, Agent, or Firm* — Volpe and Koenig, P.C.

(57) ABSTRACT

A mass balancing mechanism for balancing mass forces and/or mass torques of an internal combustion engine, said mechanism comprising a balancing shaft comprising an axis of rotation, a mass center of gravity spaced from said axis of rotation and further comprising at least one bearing peg on which said balancing shaft is mounted for rotation in a mounting location of the internal combustion engine, the bearing peg includes two axially spaced cylindrical bearing peg sections that define a recess which extends substantially or entirely outside of the axis of rotation relative to the mass center of gravity.

4 Claims, 1 Drawing Sheet

21
6
8
23
7
17
14
17
21
18
22
18
12
19

MASS BALANCING MECHANISM OF AN INTERNAL COMBUSTION ENGINE

This application is a 371 of PCT/EP2008/052852 filed Mar. 11, 2008.

FIELD OF THE INVENTION

The invention concerns a mass balancing mechanism for balancing mass forces and/or mass torques of an internal combustion engine, said mechanism comprising a balancing shaft comprising an axis of rotation, a mass center of gravity spaced from said axis of rotation and further comprising at least one bearing peg on which said balancing shaft is mounted for rotation in a mounting location of the internal combustion engine. The bearing peg includes two axially spaced cylindrical bearing peg sections that define a recess which extends substantially or entirely outside of the axis of rotation relative to the mass center of gravity.

BACKGROUND OF THE INVENTION

A mass balancing mechanism comprising a balancing shaft of the pre-cited type is disclosed in the document EP 1 081 410 B1 which is considered to be generic. To put it briefly, the proposed balancing shaft is based on the knowledge that, in a peripheral portion situated opposite the mass center of gravity, the bearing peg of the balancing shaft is subjected only to comparatively low loading and, consequently, the recess extending in this portion of the periphery between the cylindrical bearing peg sections does not detract from the bearing capacity of the bearing peg. This creates two significant advantages with regard to the goal of always keeping the mass of the balancing shaft as low as possible. On the one hand, the mass of the bearing peg is decreased in correspondence to the recess and, on the other hand, the removal of the mass of the recess leads to an enlargement of the distance of the mass center of gravity from the axis of rotation of the balancing shaft. The second advantage provides constructional scope for enhancing the unbalanced mass effect of the balancing shaft without altering the mass, or for a further reduction of the mass of the balancing shaft while maintaining a constant position of the mass center of gravity by an additional removal of material. It is clear that any other desired configurations are likewise feasible within these limits.

However, in the case of the mass balancing mechanism of the cited document, the balancing shaft is hydro dynamically slide-mounted on its bearing peg. A drawback of this resides, on the one hand, in the typical frictional losses of such sliding bearings, which can be considerable particularly at low temperatures and/or in combination with a highly viscous hydraulic medium, and can thus lead to an additional fuel consumption of the internal combustion engine that is relevant not only to the driving cycles. On the other hand, the potential of the above-mentioned advantages can only be restrictedly exploited because, with a view to building up a lubricant film with an adequate bearing capacity in the hydrodynamic sliding bearing, the bearing peg sections cannot have a random thin configuration.

OBJECTS OF THE INVENTION

An object of the present invention is therefore to improve a mass balancing mechanism of the pre-cited type so that the aforesaid drawbacks are eliminated with simple measures. In particular, it is also an object of the invention to provide room for a flexible design of the bearing peg which comprises the recess, so that, on the one hand, the aforesaid friction-based drawbacks of the sliding bearing are avoided and, on the other hand, the largest possible scope for constructional design with respect to the width of the bearing peg sections in the region of the recess and, thus also, with regard to the obtainable unbalanced mass augmentation through the recess, and/or for the reduction of the mass of the balancing shaft, is created.

These and other objects and advantages of the invention will become obvious from the following detailed description.

SUMMARY OF THE INVENTION

The invention achieves the above objects by the fact that the mounting location is configured as a rolling bearing. On the one hand, the rolling bearing as compared to a hydrodynamic sliding bearing, particularly in the presence of a highly viscous hydraulic medium resulting from low temperatures or due to its own viscosity, leads to a considerable reduction of the driving power required for the mass balancing mechanism and, thus to lower frictional losses of the internal combustion engine. On the other hand, the requirements made by a hydrodynamic sliding bearing of the width of the cylindrical bearing sections with a view to a stable lubricant film build-up in the sliding bearing are non-existent in the case of a rolling bearing. This means that in the case of a rolling bearing-mounting, the bearing peg sections can be configured clearly narrower than in the case of the sliding bearing, so that, due to this additionally reduced mass of the resulting wider recess between the bearing peg sections, the aforesaid potential of augmenting the unbalanced mass and/or of mass reduction of the balancing shaft can be optimally exhausted.

Based on the knowledge that, in the case of loading of the mounting location, the bearing pin is subjected to a lumped load on the side of the mass center of gravity, i.e. at the peripheral portion corresponding to the entire width of the bearing peg and, on the other side, to a peripheral load rotating with the mass center of gravity within the housing in which the balancing shaft is mounted, the invention further proposes a rolling bearing configured as a needle roller bearing without an inner race ring whose needle rollers are in rolling contact with the bearing peg while (cyclically) bridging the bearing peg sections in axial direction. Because the bearing peg is subjected only to a low load in the region of the recess, an impermissibly high material loading of the bearing peg sections serving directly as a raceway for the needle rollers can be excluded, so that the radial design space requirement of a rolling bearing compared to a sliding bearing can be reduced to a minimum not only due to the omission of an inner race ring but also through the use of needle rollers of small diameter.

This applies particularly in the case of a needle roller bearing configured as a needle roller bushing comprising a thin-walled outer race ring made without chip removal, a cage and needle rollers guided therein.

Moreover, the invention proposes an unpressurized lubrication of the rolling bearing by means of the lubricating oil mist which is produced in any case during the operation of the internal combustion engine. The bearing peg projects radially beyond at least one adjoining shaft section at least within a fractional periphery, and at least one radially outwards extending rib is arranged within this fractional periphery between the shaft section and the associated bearing peg section, said rib being arranged at an angle of inclination to the axis of rotation of the balancing shaft and serving as a shovel for pressure or suction delivery of the lubricating oil mist into the rolling bearing. In contrast to the complex pressure medium supply for a hydrodynamic sliding bearing which loads the hydraulic medium pump of the internal combustion engine, the lubricating oil mist that develops on its own in the housing is utilized for a production-neutral and cost-neutral lubricating oil supply to the rolling bearing in that, depending on the angle of inclination of the individual ribs, either a pressurized stream of lubricating oil mist directed from the rib to the rolling bearing or a suction flow of the lubricating oil mist flowing through the rolling bearing to the rib is produced during the rotation of the balancing shaft. In the case of a balancing shaft comprising stiffening ribs as proposed in the pre-cited document, these need only to be turned through the angle of inclination and can thus likewise be arranged cost-neutral on the balancing shaft. As is known to the person skilled in the art of turbo-machines, the rib configured as a shovel is obviously not meant to be limited only to a flat rib with a constant angle of inclination but can also comprise a profile adapted to the targeted streaming or deflection including an angle of inclination that is variable over the axial length of the rib.

Finally, for stiffening the balancing shaft and for promoting the above-mentioned pressure or suction delivery of the lubricating oil mist into the rolling bearing, the invention proposes to arrange in the recess, at least one web extending radially outwards and connecting the bearing peg sections to each other, this web and the rib being inclined at the same angle of inclination to the axis of rotation of the balancing shaft.

Insofar as possible and appropriate, the above-mentioned features and embodiments of the invention can also be combined in a suitable manner with each other.

BRIEF DESCRIPTION OF THE DRAWINGS

Further features and developments of the invention result from the following description and the appended drawings in which examples of embodiment of the invention are represented in a partially simplified manner.

FIG. 1 shows a balancing shaft of as a mass balancing mechanism of the invention, in a perspective illustration.

DETAILED DESCRIPTION OF THE DRAWINGS

Figure 2:
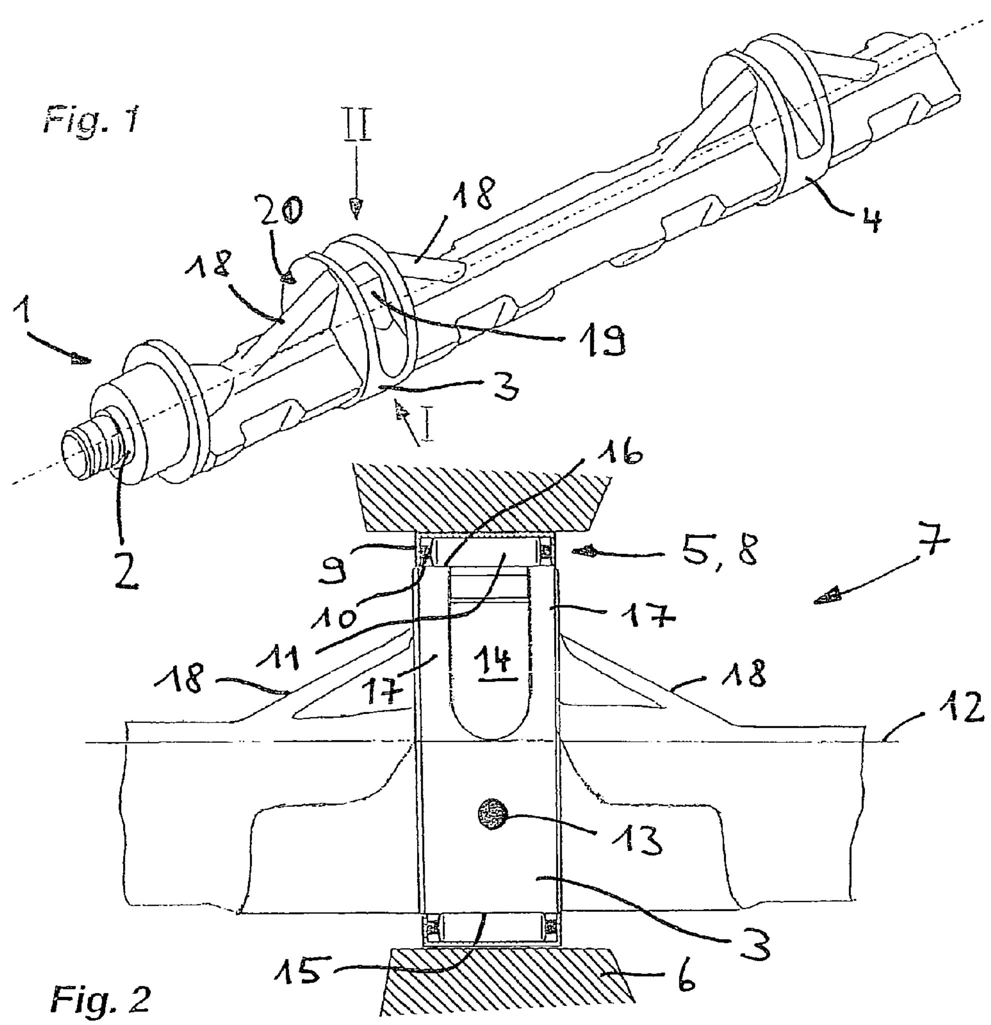
FIG. 2 shows the view I of FIG. 1 as a longitudinal section of a mounting location.

In FIG. 1, a balancing shaft 1 is disclosed as a part of a mass balancing mechanism for balancing mass forces and/or mass torques of an internal combustion engine. The mass balancing mechanism known per se to a person skilled in the art and not specifically illustrated here, serves in the present case for the balancing of mass forces of the second order in a multi-cylinder in-line engine and comprises two balancing shafts 1 which rotate in opposite directions at double the speed of rotation of the crankshaft. The balancing shaft 1 is driven at a drive section 2, for example, through a sprocket or a gear-wheel and comprises two bearing pegs 3 and 4 on which the balancing shaft 1 is radially mounted in mounting locations 5 of a housing 6 (see FIG. 2 or 3) of the internal combustion engine.

As will be explained further below, the bearing pegs 3 and 4 illustrated in FIG. 1 have different structural configurations and have been shown mounted on one and the same balancing shaft 1 only for the sake of simplification. In practice and depending on the stiffness requirements made of the balancing shaft 1 of a mass balancing mechanism, it can be expedient or necessary to configure the bearing pegs 3 and 4 identically.

Figure 3:
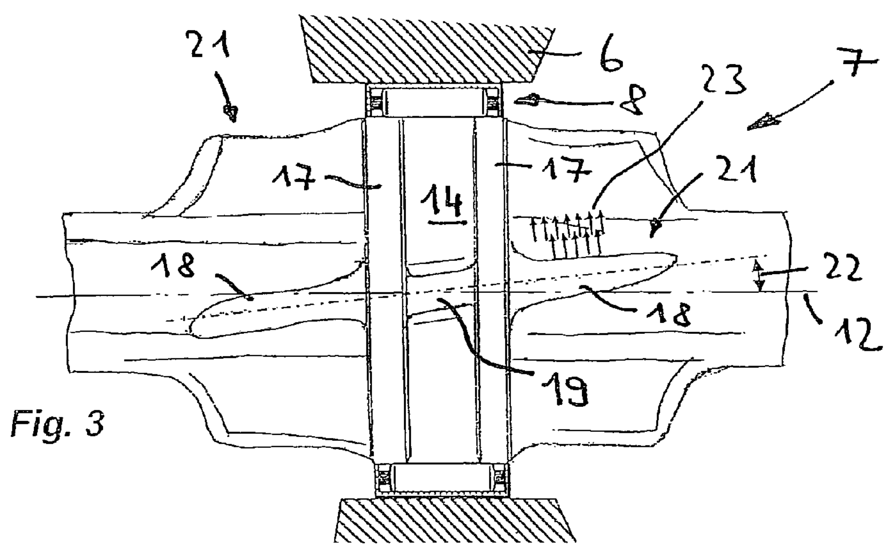
FIG. 3 shows the view II of FIG. 1 as a longitudinal section of the mounting location.

In FIGS. 2 and 3, the mass balancing mechanism identified at 7 in the views I and II of FIG. 1 including the roughly indicated housing 6 is shown on an enlarged scale in the region of the bearing peg 3. The housing 6 can either be a direct component part of the crankcase of the internal combustion engine or it can be configured as a separate transmission housing firmly connected to the crankcase. Each of the mounting locations 5 is configured as a rolling bearing 8 in which a respective one of the bearing pegs 3 and 4 of the balancing shaft 1 is rotatably mounted. In the present example of embodiment, the rolling bearing 8 is made without an inner ring as a needle roller bearing, here, in the form of a needle roller bushing, and comprises a thin-walled outer race ring 9 fabricated without chip removal, a cage 10 and the needle rollers 11 guided therein. The needle rollers 11 are in direct rolling contact with the bearing peg 3 which comprises a recess 14 extending outside of the axis of rotation 12 relative to a center of gravity 13 that is spaced from the axis of rotation 12 of the balancing shaft 1. With regard to the kinematics of the needle roller bearing 8, this means that the needle rollers 11 are in rolling contact alternately with a first peripheral portion 15 on the side of the center of gravity 13, the width of this peripheral potion 15 corresponding to the entire width of bearing peg 3, and with a second peripheral portion 16 on the side turned away from the center of gravity 13, the width of this second peripheral portion 16 corresponding to the sum of the widths of two cylindrical bearing peg sections 17 that define the recess 14.

Due to the specific loading conditions of the balancing shaft 1 at the mounting location 5 involving a point loading of the bearing peg 3 on the side of center of gravity 13 and peripheral loading on the side of the housing 6, the bearing peg sections 17 which are subjected only to a slight load, can be configured even considerably narrower than illustrated as long as they are bridged axially by the needle rollers 11. As an alternative to the embodiment of the bearing peg 3 shown in FIG. 2 whose second peripheral portion 16 in the region of the recess 14 extends through approximately 180°, the recess 14 may also extend over an angular range clearly larger or smaller than this angle as long as it extends, at least substantially, outside of the axis of rotation 12 relative to the center of gravity 13.

As explained below with reference to FIG. 3, the lubrication of the needle roller bearing 8 is effected free of pressure by means of the lubricating oil mist produced during the operation of the internal combustion engine. The lubricating oil mist is routed into the needle roller bearing 8 by reason of a pressure or suction delivery produced by radially outwards extending ribs 18. The ribs 18, as also a web 19 that extends radially outwards within the recess 14 and connects the bearing peg sections 17, serve to stiffen the balancing shaft 1 and extend respectively between the bearing peg 3 and a shaft section 21 adjoining the bearing peg 3 which extends radially beyond this shaft section 21 within a fractional periphery 20 (see FIG. 1). In the case of the bearing peg 3 illustrated in FIG. 2, the fractional periphery 20 and the second peripheral portion 16 of the bearing peg 3 extend through substantially identical angles of 180°.

As already mentioned above, the web 19 is a constructional option and is shown only in the case of the bearing peg 3, but in practice it can be appropriately provided in both or in neither of the bearing pegs 3 and 4.

Through the ribs 18 acting as shovels, a stream or deflection of the lubricating oil mist is produced in direction of the needle roller bearing 8. As disclosed in FIG. 3, for this purpose, the ribs 18 are inclined at an angle of inclination 22 to the axis of rotation 12 of the balancing shaft 1, so that the lubricating oil mist, in the present case independently of the direction of rotation of the balancing shaft 1, is transported, on the one side, into the needle roller bearing 8 and, on the other side, it is suctioned through the needle roller bearing 8. The stream or deflection of the lubricating oil mist symbolized by the group of arrows 23 is intensified within the recess 14 of the bearing peg 3 by the web 19 which extends at the same angle of inclination 22 as the ribs 18 relative to the axis of rotation 12.

The invention claimed is:

1. A mass balancing mechanism for balancing mass forces and/or mass torques of an internal combustion engine, said mechanism comprising a balancing shaft comprising an axis of rotation, a mass center of gravity spaced from said axis of rotation and further comprising at least one bearing peg on which said balancing shaft is mounted for rotation in a mounting location of the internal combustion engine, said bearing peg including two axially spaced cylindrical bearing peg sections that define a recess which extends substantially or entirely outside of the axis of rotation relative to the mass center of gravity, the mounting location is configured as a rolling bearing, said bearing peg projects radially beyond at least one adjoining shaft section at least within a fractional periphery, and at least one radially outwards extending rib is arranged within this fractional periphery between the shaft section and an associated one of the bearing peg sections, said rib being arranged at an angle of inclination to the axis of rotation of the balancing shaft and serving as a shovel for pressure or suction delivery of lubricating oil mist into the rolling bearing which is produced during operation of the internal combustion engine.

2. A mass balancing mechanism of claim 1, wherein the rolling bearing is configured as a needle roller bearing without an inner race ring, and needle rollers of the bearing are in rolling contact with the bearing peg while bridging the bearing peg sections in the axial direction.

3. A mass balancing mechanism of claim 2, wherein the rolling bearing is configured as a needle roller bushing comprising a thin-walled outer race ring, and a cage in which the needle rollers are guided.

4. A mass balancing mechanism of claim 1, wherein at least one web is arranged in the recess to extend radially outwards and connect the bearing peg sections to each other, this web and the rib being inclined at a same angle of inclination to the axis of rotation of the balancing shaft.

* * * * *